*H. Heckman,*
*Pump Piston,*
*№ 280,            Patented July 17, 1837.*
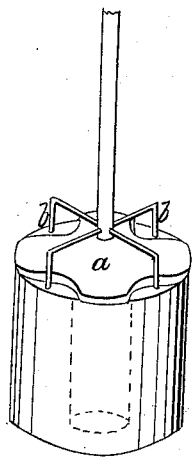

UNITED STATES PATENT OFFICE.

HENRY HECKMAN, OF NEWBURG, PENNSYLVANIA.

CONSTRUCTION OF VALVES FOR PUMPS.

Specification of Letters Patent No. 280, dated July 17, 1837.

*To all whom it may concern:*

Be it known that I, HENRY HECKMAN, of Newburg, in the county of Cumberland, in the State of Pennsylvania, have invented an Improvement in the Manner of Constructing Valves for Sucking and Forcing Pumps of All Description, and the the following is a full and exact description thereof.

The valve $a$ which covers the opening in the upper and lower boxes, I form of a flat plate of metal, which may be made round, and have four notches, or grooves formed on its edge, to bear against guide pieces to be presently described. Upon that side of the flat plate which is to cover the opening in the piston, box, or bucket, I fasten leather, or other suitable flexible material, the more perfectly to close such opening. This metal plate lies loosely upon the opening, not being hinged, or otherwise attached to the box, or piston; but to prevent its moving out of its proper place, and yet to allow it to rise and fall freely, I bend rods of iron $b$, $b$, in the form of a staple, taking two such staples to each valve, and confine it to its box or seat, by passing them over the valve, at right angles to each other, fastening them securely to the seat. One or both of these staples should be of a diameter less than that of the plate of the valve, that it may enter the notches above named, and check the plate in such a way as to prevent its turning around; this, however, is not absolutely necessary, as, if well fitted, the valve plate may be left perfectly round, and the staples fit against its edges.

What I claim as my invention, and wish to secure by Letters Patent is—

The forming of the valves for pumps of a flat plate, and confining them in their places, in the manner set forth.

HENRY HECKMAN.

Witnesses:
    THOS. P. JONES,
    W. THOMPSON.